Oct. 4, 1938. W. L. MORRISON 2,131,745
VENTILATING DEVICE FOR AUTOMOBILES
Filed Sept. 27, 1933 7 Sheets-Sheet 1
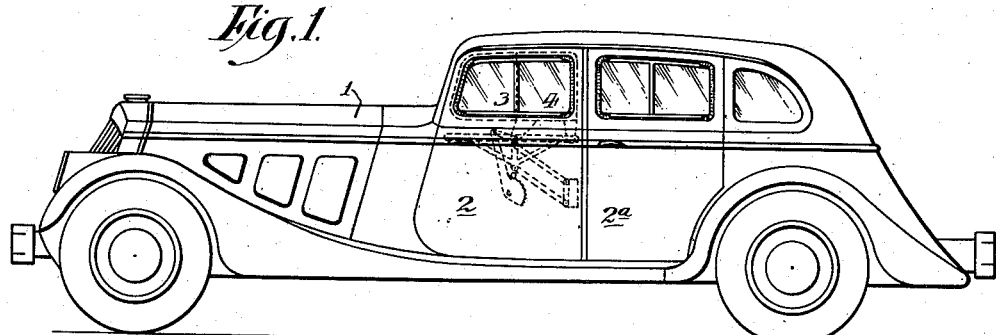
Fig.1.
Fig.2.
Fig.3.
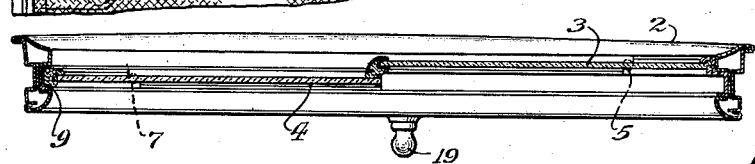
Inventor:
Willard L. Morrison,
By Parker + Carter Att'ys.

Oct. 4, 1938.  W. L. MORRISON  2,131,745
VENTILATING DEVICE FOR AUTOMOBILES
Filed Sept. 27, 1933  7 Sheets-Sheet 2
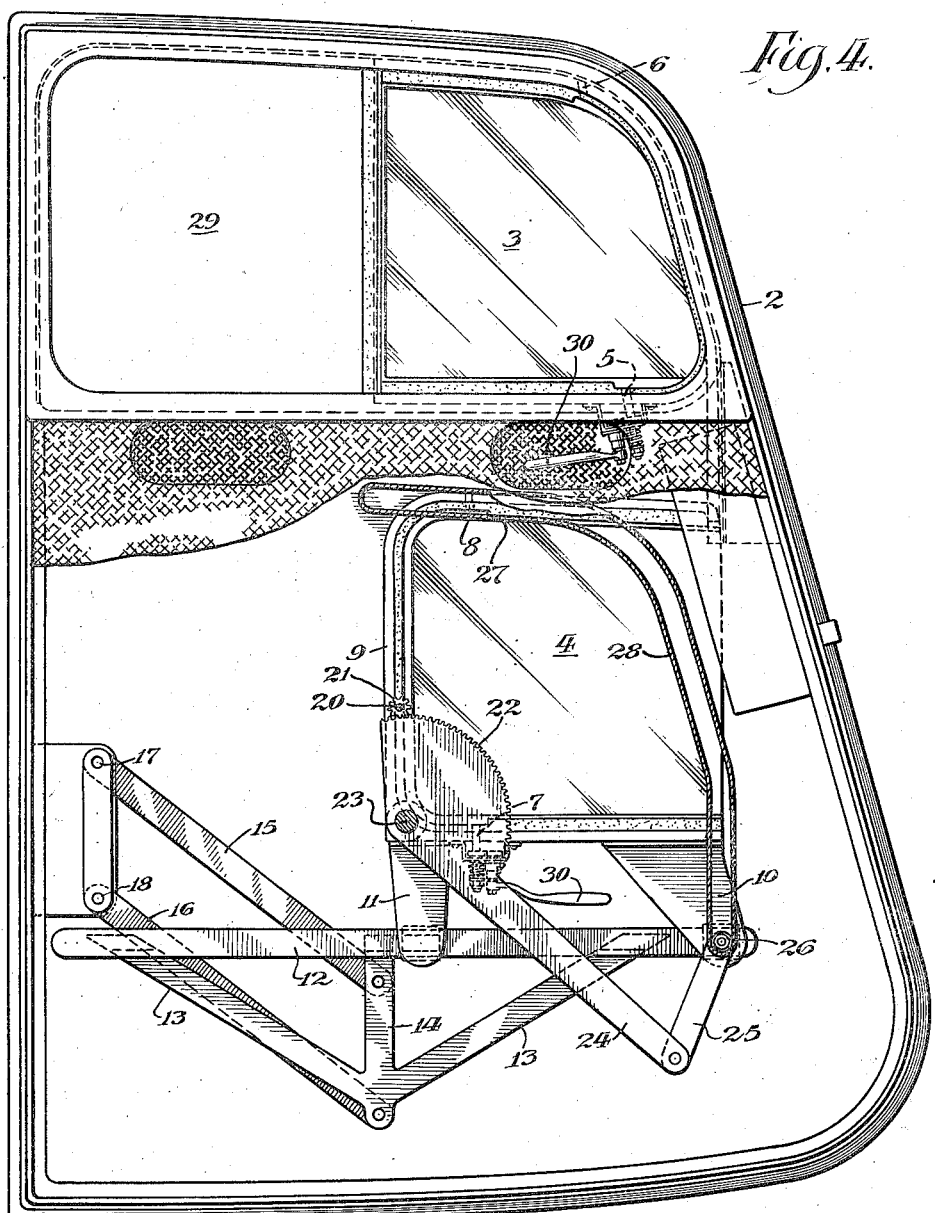
Fig. 4.
Fig. 5.
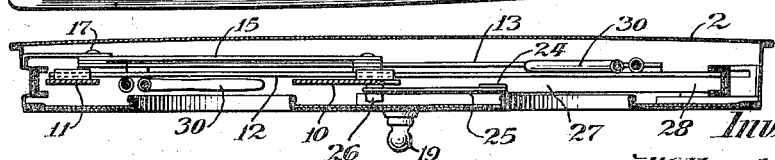
Inventor:
Willard L. Morrison
By Parker + Carter Oct. 4, 1938.　　　W. L. MORRISON　　　2,131,745
VENTILATING DEVICE FOR AUTOMOBILES
Filed Sept. 27, 1933　　　7 Sheets-Sheet 3
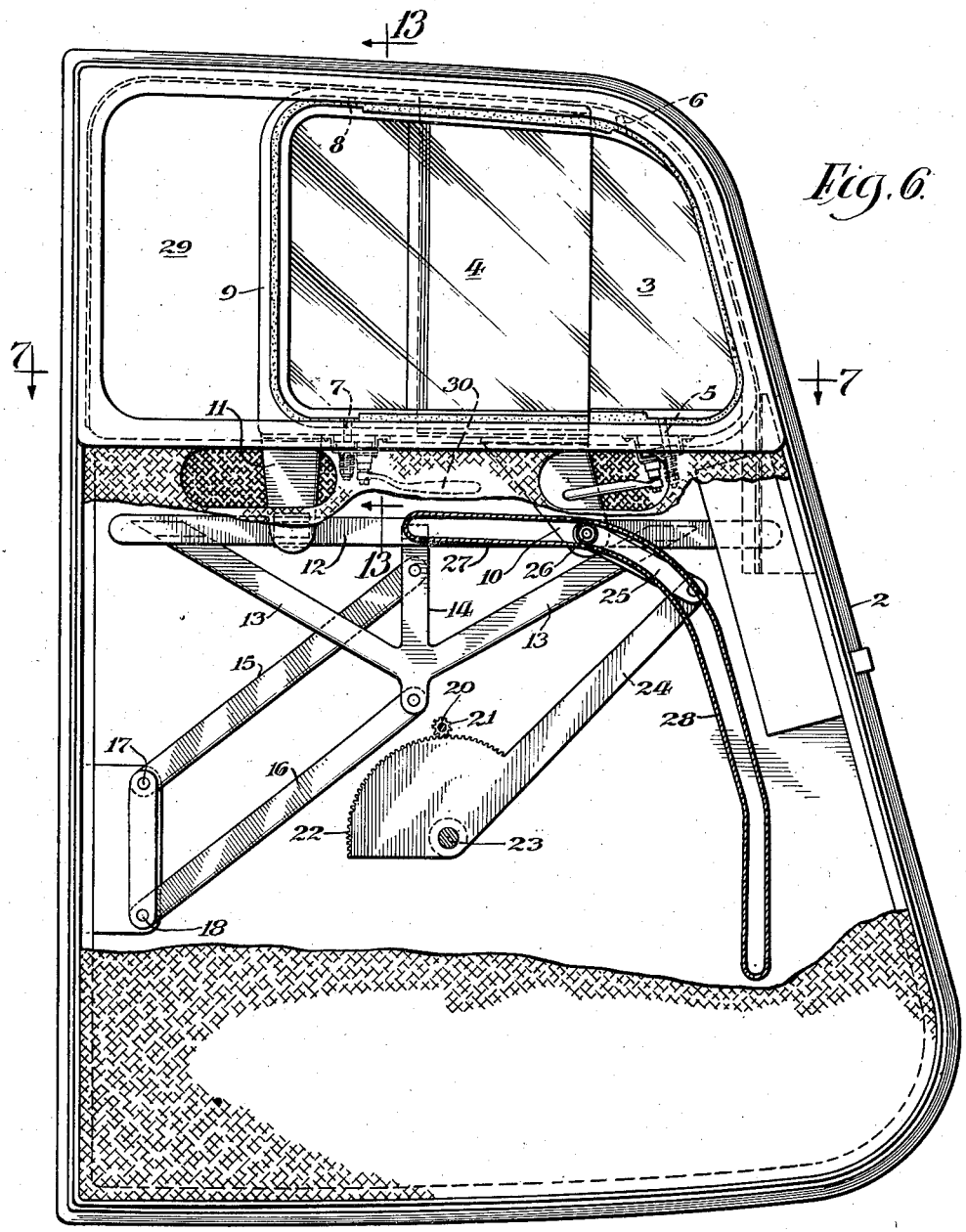
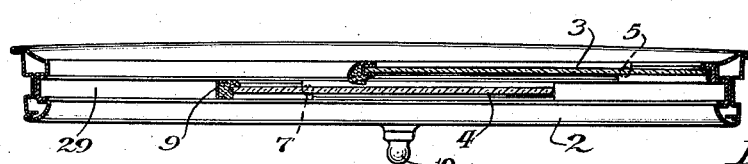
Inventor:
Willard L. Morrison,
By Parker + Carter Attys.

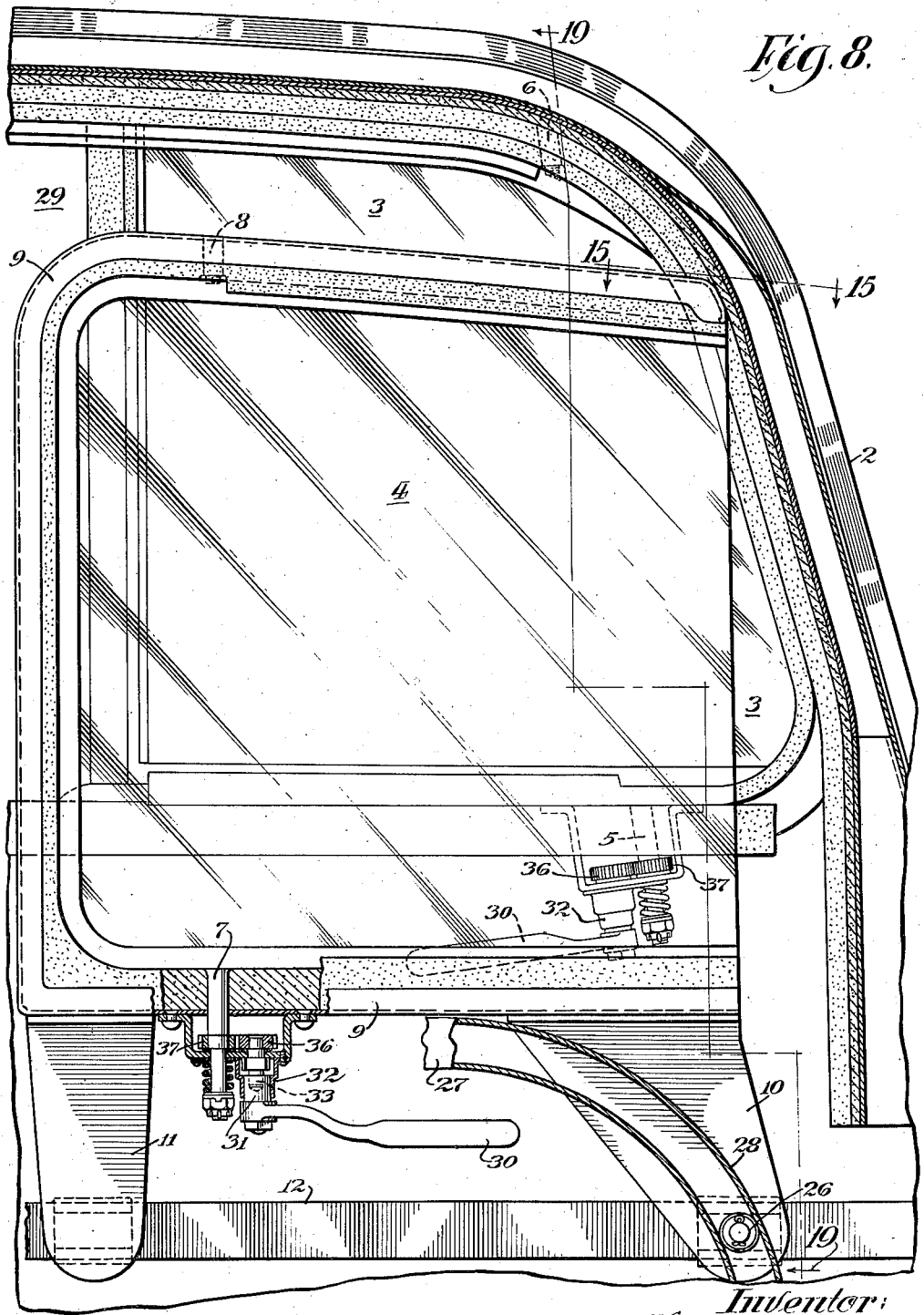

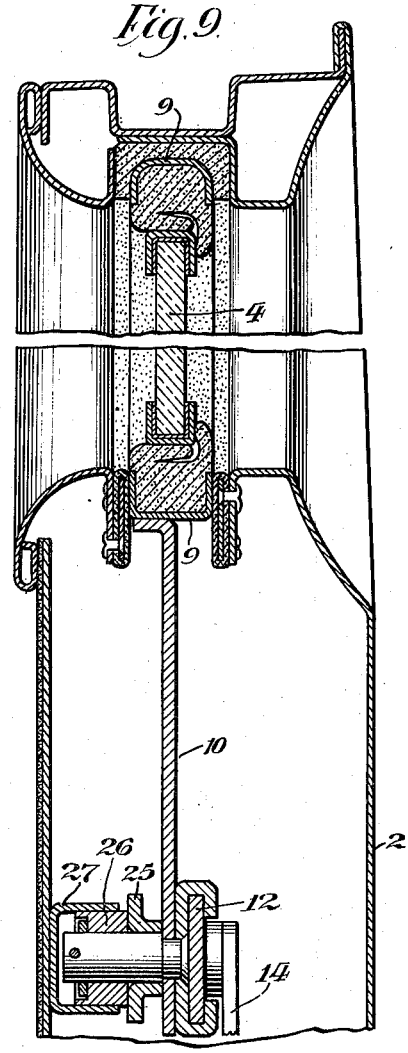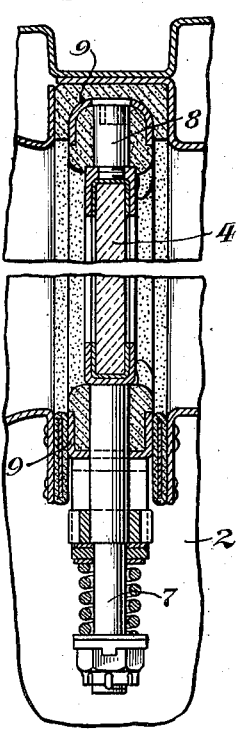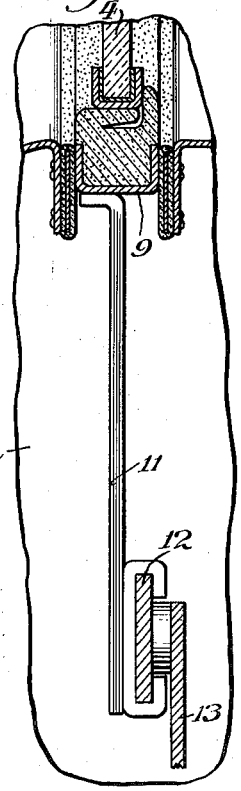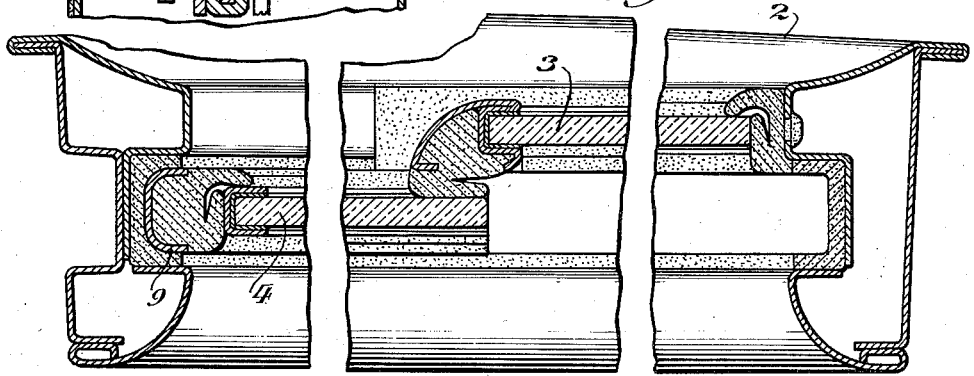

Oct. 4, 1938.  W. L. MORRISON  2,131,745
VENTILATING DEVICE FOR AUTOMOBILES
Filed Sept. 27, 1933  7 Sheets-Sheet 6

Inventor:
Willard L. Morrison,
By Parker & Carter

Oct. 4, 1938.   W. L. MORRISON   2,131,745
VENTILATING DEVICE FOR AUTOMOBILES
Filed Sept. 27, 1933   7 Sheets-Sheet 7
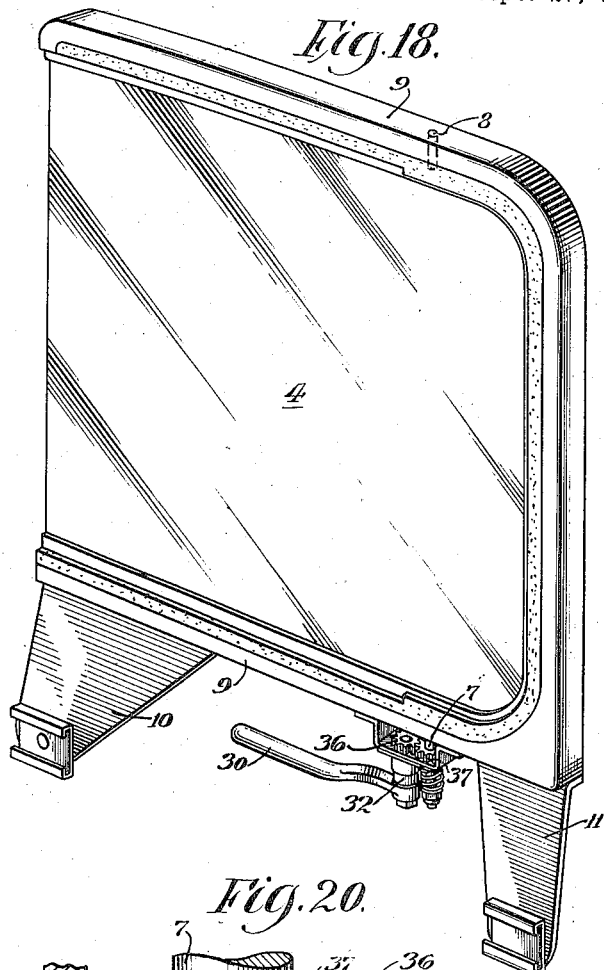
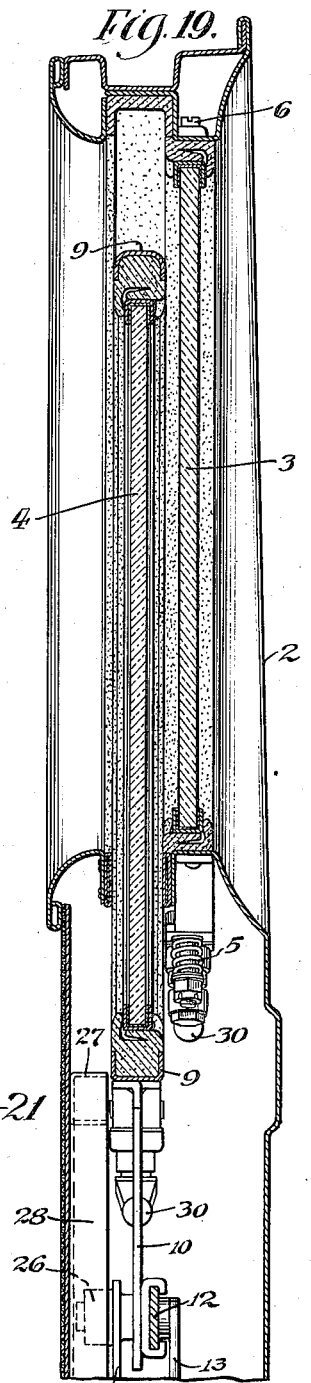
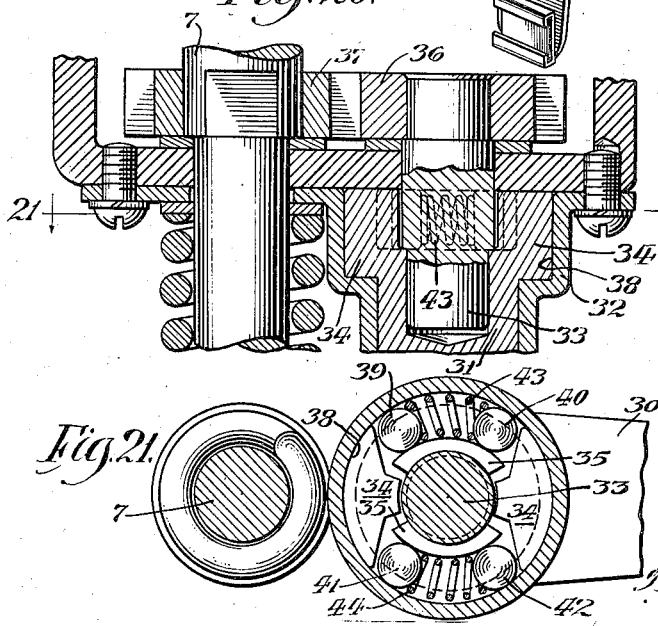

Patented Oct. 4, 1938

2,131,745

UNITED STATES PATENT OFFICE 2,131,745

VENTILATING DEVICE FOR AUTOMOBILES

Willard L. Morrison, Lake Forest, Ill.

Application September 27, 1933, Serial No. 691,105

10 Claims. (Cl. 296—44)

This invention relates to ventilating devices for automobiles and has for its object to provide a new and improved device of this description. The invention has as a further object to provide a ventilating device wherein there is a window that can be slid down out of the way, but which can also be slid to one side to leave an opening for signalling, or other purposes, without fully opening the space covered by said window when closed. The invention has as a further object to provide a ventilating device wherein there is a pivoted window section and a sliding window section with means for sliding the window section longitudinally with relation to the automobile and up and down. The invention has as a further object to provide a ventilating device having a sliding window section which is also pivoted. The invention has further objects which are more particularly pointed out in the accompanying description.

Referring now to the drawings,

Fig. 1 is a view of an automobile provided with a ventilating device embodying the invention;

Fig. 2 is a view from the inside showing one form of the ventilating device shown in Fig. 1 in closed position;

Fig. 3 is a sectional view taken on line 3—3 of Fig. 2;

Fig. 4 is a view similar to Fig. 2 showing the sliding window down;

Fig. 5 is a sectional view taken on line 5—5 of Fig. 2;

Fig. 6 is a view similar to Fig. 4 showing the sliding window moved laterally;

Fig. 7 is a sectional view taken on line 7—7 of Fig. 6;

Fig. 8 is an enlarged view similar to Fig. 6 showing only a portion of the device and showing the sliding window after it has started down;

Fig. 9 is a sectional view, with parts broken away, taken on line 9—9 of Fig. 2;

Fig. 10 is an enlarged sectional view, with parts broken away, taken on line 10—10 of Fig. 2;

Fig. 11 is an enlarged sectional view taken on line 11—11 of Fig. 2;

Fig. 12 is an enlarged sectional view, with parts broken away, showing the pivoted and sliding window, both in their closed positions;

Fig. 18 is a perspective view of the sliding window section;

Fig. 19 is a sectional view taken on line 19—19 of Fig. 8;

Fig. 20 is a sectional view through the upper ends of one of the friction pivots and the driving connection thereto;

Fig. 21 is a sectional view taken on line 21—21 of Fig. 20.

Like numerals refer to like parts throughout the several figures.

Figure 13:
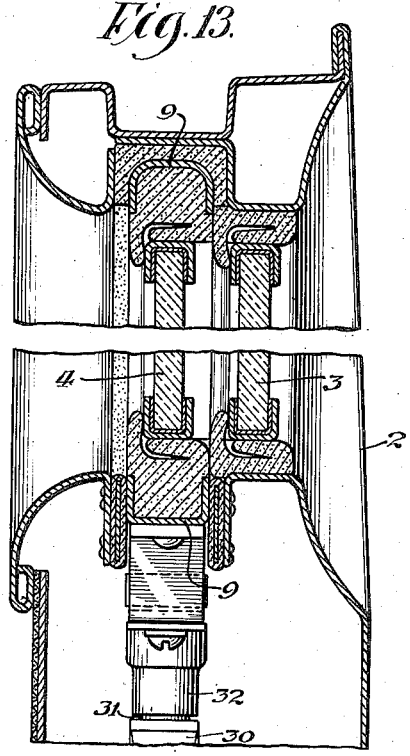
Fig. 13 is an enlarged sectional view, with parts omitted, taken on line 13—13 of Fig. 6.
Figure 14:
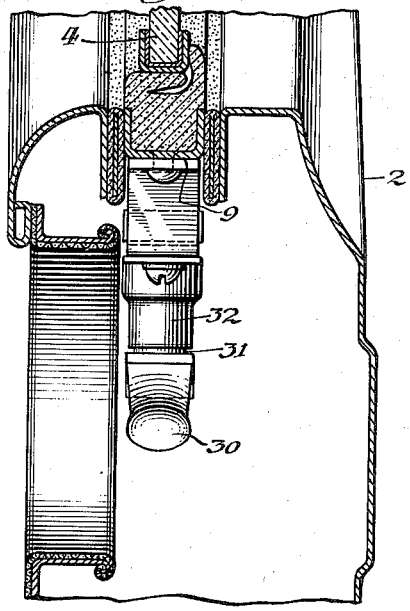
Fig. 14 is an enlarged sectional view taken on line 14—14 of Fig. 2.
Figure 15:
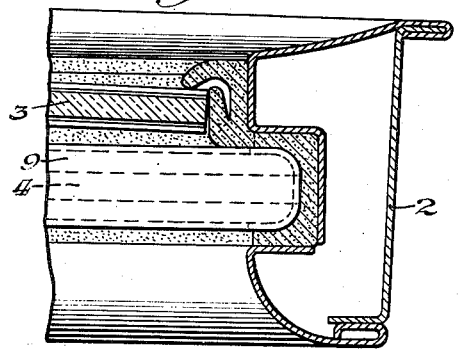
Fig. 15 is a sectional view taken on line 15—15 of Fig. 8.
Figure 16:
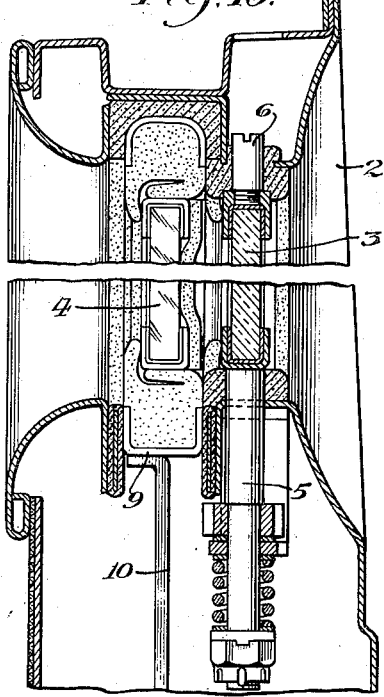
Fig. 16 is an enlarged sectional view, with parts broken away, taken on line 16—16 of Fig. 2.
Figure 17:
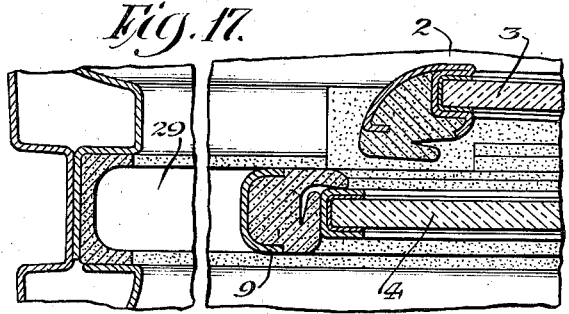
Fig. 17 is a view similar to Fig. 12, with parts broken away, showing the position of the windows when the sliding section has been moved laterally.

In the present device I have shown an automobile 1 provided with one form of the ventilating device. This automobile is provided with the doors 2 and 2a, and the front doors, or all of the doors, may be provided with the ventilating device. For purposes of illustration I have shown the ventilating device in connection with one of the front doors 2.

In this construction there are two windows 3 and 4. The front window 3 is pivotally mounted in position by the pivots 5 and 6 at the top and bottom thereof. The pivot 5 is a pivot provided with means for resisting the pivotal movement of the window. The window 4 may also be pivotally mounted near its rear ends by the pivots 7 and 8, although these pivots may be omitted if desired. When these pivots are used, the window 4 is pivotally mounted in a frame 9 which can be moved longitudinally with relation to the automobile and downwardly.

Some means is provided for moving the window 4 longitudinally with relation to the automobile, preferably forward, so as to leave a space for signalling or other purposes without opening the entire space covered by the window when closed, and also for moving it down to open the entire space. I have illustrated one particular construction for this purpose. The frame 9 has the projecting members 10 and 11. A cross member 12 is provided to which the window 4 is movably or slidably connected through the members 10 and 11. Connected with the cross member 12 are the members 13 and 14. Pivotally connected with the member 14 are the arms 15 and 16, pivoted at 17 and 18 to a fixed part. A crank 19 is connected with a shaft 20 on which is a pinion 21 engaging a toothed rack 22 pivoted at 23. Connected with the toothed rack is an arm 24 and there is a link 25 connecting this arm with the section 4 through the agency of the part 10. A guide engaging member 26 is connected with the part 10 and works in a guide which has a substantially straight portion 27 and a downwardly extending portion 28.

When the parts are in the position shown in Fig. 2 and the crank is turned, the arm 24 is moved and this moves the section 4 longitudinally with relation to the automobile, the guide engaging device 26 moving along the portion 27 of the guide. This causes the window section 4 to be moved longitudinally with relation to the automobile so that it overlaps a portion of the window section 3 and leaves a space 29 open from the top to the bottom of the section and at the rear end thereof, as clearly shown in Fig. 6. This permits easy signaling by the driver, who can stick his arm out this opening and make any signal he desires.

If it is desired to completely lower the window section 4, the crank is turned further and the guide engaging member 26 passes along the downwardly extending portion 28 of the guide and the window section 4 is carried downwardly, the parts being in the position shown in Fig. 4, the rear window section when down being underneath the section 3.

Each window section is provided with means for moving it about its pivots, which as herein shown consists of the handle 30 connected with a shaft 31 which is mounted in a sleeve 32. A shaft 33 projects in an opening in the shaft 31. The shaft 31 has projections 34, and the shaft 33 has projections 35 which are engaged when the handle is moved. The shaft 33 has a pinion 36 which engages a pinion 37 on the pivot 7, see Fig. 20. The sleeve 32 is enlarged at its upper end to receive the projections 34 and 35. The outer cylindrical surface of the projections 35 has a greater diameter than the inner surface 38 of the sleeve 32. Located between the projections 35 and the inner surface 38 of the sleeve are the rollers 39, 40, 41 and 42 with the springs 43 and 44 located between them. When the handle 30 is moved the shaft 31 is moved, and by and through the agency of the projections 34 and 35 the shaft 33 is moved so as to rock the pivoted section 3. If it is attempted to move the pivoted section 3 by applying pressure thereto, there is a tendency to rotate the shaft 33 and this, because of the differences in diameter of the surfaces against which the rollers press, causes two of the rollers to be clamped between these surfaces, thereby locking the shaft 33 against movement. This construction is not claimed in the present application, but in a separate application heretofore filed.

It will be seen that both the front and rear sections may be moved to different angular positions when in their up position, and that by means of this construction the rear window section may be moved laterally to overlap a portion of the front section so as to leave a space at the rear extending from the top to the bottom through which the arm of the person in the automobile may be projected for signaling purposes or for any other purpose. It will further be seen that when the window section 4 is down, it is up near the front of the door and beneath the front window section.

The window sections are provided with suitable sealing devices, the details of which are no part of the present invention.

I claim:

1. A ventilating device for automobiles comprising a frame forming a window opening, a front and a rear section for closing said window opening, one back of the other, a receiving space below the front section and means for moving the rear section down into said space so that it will be below the front section.

2. A ventilating device for automobiles comprising a frame forming a window opening, a front and a rear section for closing said window opening, one back of the other, actuating mechanism located below the window sections for moving one of the sections longitudinally with relation to the other section, to partially overlap the other section to leave an open space in the frame back of said section extending vertically therealong through which the arm of the occupant of the automobile may be protruded for signalling purposes, the rear end of the front section being movable outwardly when the rear section is overlapping the front section, to deflect air away from the opening at the rear of the rear section.

3. A ventilating device for automobiles comprising a frame forming a window opening, a front and a rear section for closing said window opening, one back of the other, actuating mechanism for moving one of the sections longitudinally with relation to the other section, to partially overlap the other section to leave an open space in the frame back of the said section extending vertically therealong through which the arm of the occupant of the automobile may be protruded for signalling purposes, said same actuating mechanism acting by a further movement for additionally moving said rear section down in a general vertical direction out of the way.

4. A ventilating device for automobiles comprising a frame forming a window opening, a front and a rear section for closing said window opening, one back of the other, actuating mechanism for moving one of the sections longitudinally with relation to the other section, to partially overlap the other section to leave an open space in the frame back of said section extending vertically therealong through which the arm of the occupant of the automobile may be protruded for signalling purposes, said same actuating mechanism acting by a further movement for additionally moving said rear section down in a general vertical direction out of the way, said rear section when down being underneath the front section.

5. A ventilating device for automobiles comprising a frame forming a window opening, a front and a rear section for closing said window opening, one back of the other, actuating mechanism for sliding one of the sections longitudinally with relation to the other section, to partially overlap the other section to leave an open space in the frame back of said section extending vertically therealong through which the arm of the occupant of the automobile may be protruded for signalling purposes, both of said sections being pivotally mounted.

6. A ventilating device for automobiles comprising a frame forming a window opening, a front and a rear pivoted section for closing said window opening, one back of the other, a guide engaging member connected with said sections, a guide extending longitudinally with relation to the automobile, engaged by said guide engaging member, and actuating mechanism located below the window sections for moving said guide engaging member along said guide to move the section and its pivot longitudinally to provide an open space in the frame at one end thereof, the other section remaining in its original position.

7. A ventilating device for automobiles comprising a frame forming a window opening, a front and a rear section for closing said window opening, one back of the other, a guide engaging member connected with said section, a guide extending longitudinally with relation to the automobile, engaged by said guide engaging member, and actuating mechanism for moving said guide engaging member along said guide to move the section longitudinally to provide an open space in the frame at one end thereof, said guide having a downwardly extending portion along which the guide engaging member passes upon a further movement of said actuating mechanism to lower said section.

8. A ventilating device for automobiles comprising a frame forming a window opening, a front and a rear section for closing said window opening, one back of the other, a guide engaging member connected with said section, a guide extending longitudinally with relation to the automobile, engaged by said guide engaging member, and actuating mechanism for moving said guide engaging member along said guide to move the section longitudinally to provide an open space in the frame at one end thereof, said guide having a downwardly extending portion along which the guide engaging member passes upon a further movement of said actuating mechanism to lower said section, said guide being located beneath the front section.

9. A vehicle window construction comprising a vertically adjustable carrier, a supporting member mounted on said carrier, said supporting member being slidably adjustable on said carrier longitudinally of the vehicle, a glass panel fixed to said supporting member, mechanism connected with said carrier for raising and lowering the same, and means connecting said mechanism with said supporting member, the actuation of said mechanism while said carrier is in its uppermost position adjusting the supporting mechanism on the carrier longitudinally of the vehicle.

10. A ventilating device for automobiles comprising a frame forming a window opening, a front and a rear section for closing said window opening, one back of the other, actuating mechanism for moving one of the sections longitudinally with relation to the other section, to partially overlap the other section to leave an open space in the frame back of the said section extending vertically therealong, said same actuating mechanism acting by a further movement for additionally moving said rear section down in a general vertical direction out of the way.

WILLARD L. MORRISON.